United States Patent [19]

Clark et al.

[11] 3,797,561

[45] Mar. 19, 1974

[54] OIL TANKS AND COOLERS

[75] Inventors: Kenneth William Clark; Clifford Stanley Woodward, both of Bristol, England

[73] Assignee: Secretary of State for Defence in Her Britannic Majesty's Government of the United Kingdom of Great Britain & Northern Ireland, London, England

[22] Filed: Sept. 20, 1971

[21] Appl. No.: 182,090

[30] Foreign Application Priority Data
Oct. 2, 1970 Great Britain.................... 46925/70

[52] U.S. Cl..................................... 165/37, 165/51
[51] Int. Cl. ............................................ G05d 23/00
[58] Field of Search........................... 165/37, 17, 60

[56] References Cited
UNITED STATES PATENTS
2,428,280   9/1947   Jensen ................................. 165/37
2,830,798   4/1958   Andersen................................ 165/37

Primary Examiner—Charles Sukalo
Attorney, Agent, or Firm—Stevens, Davis, Miller & Mosher

[57] ABSTRACT

A ducted fan gas turbine engine has a flow splitter in the fan duct which is hollow to define an oil tank, and is double-walled to define a passage between the external wall of the oil tank and an outer wall. Hot oil is directed along the passage and the external surface of the flow splitter acts as a surface cooler in the relatively cool fan air flow. Direct communication is provided between the oil cooler passage and the interior of the tank thus minimising exterior pipework.

9 Claims, 4 Drawing Figures

PATENTED MAR 19 1974

OIL TANKS AND COOLERS

The present invention relates to an oil system for a gas turbine engine and includes a gas turbine engine incorporating the oil system.

According to the present invention there is provided an oil system for a gas turbine engine comprising an oil tank, an oil cooler, means for supplying oil from the tank to a location of use, and means for returning the oil to the tank via the cooler, wherein the oil tank is enclosed within a first wall which forms the external wall of the tank, the oil cooler is in the form of an elongate passage defined between the external wall of the tank and an outer wall and through which hot oil may flow, from one end thereof, in contact with one surface of the outer wall, the opposite surface of the outer wall being exposed to a flow of relatively cold air to effect cooling of the oil, the other end of the oil cooler passage opening directly into the interior of the oil tank for returning cooled oil to the tank.

Preferably the outer wall completely surrounds the external wall of the tank and said external wall of the tank is of corrugated form so that the tops of the corrugations can be attached to the outer wall while leaving spaces for the passage of oil.

The invention is particularly applicable to the kind of engine known as a ducted fan engine in which the fan is driven through a gear box from a rotor of the engine. Such an engine will hereinafter be referred to as a ducted fan engine of the kind described.

In an engine of the kind described, not only does the gear box require oil in addition to the normal gas generator oil requirements, but the gear box produces heat in its oil supply, which has to be cooled. Hence the capacities of the engine oil tank and oil cooler must be greatly increased compared with engines without such gear boxes, so that problems arise as to where to place such large items and how to provide sufficient surface areas for the oil cooler.

The present invention has for an object to provide an oil system which includes an oil tank and cooler for an engine of the kind described without introducing excessive penalties.

According to a feature of the present invention, therefore, in a ducted fan engine of the kind described the fan duct is provided with an annular flow splitter near its mid-radius height, and at least a portion of the flow splitter incorporates a combined oil tank and cooler as hereinbefore described, arranged in such a manner that the outer wall is the surface of the splitter which is exposed to the flow of by-pass air in the duct.

In one embodiment the rear portion only of the splitter comprises the combined oil tank and cooler.

Also preferably since the by-pass air flows over both surfaces of the splitter the oil tank is formed as a complete annulus within the wall, and the oil cooler comprises two passages defined between the external wall of the oil tank, on opposite sides thereof, and the radially inner and outer walls of the splitter respectively.

The invention will now be more particularly described, merely by way of example, with reference to the accompanying drawings in which.

Figure 1:
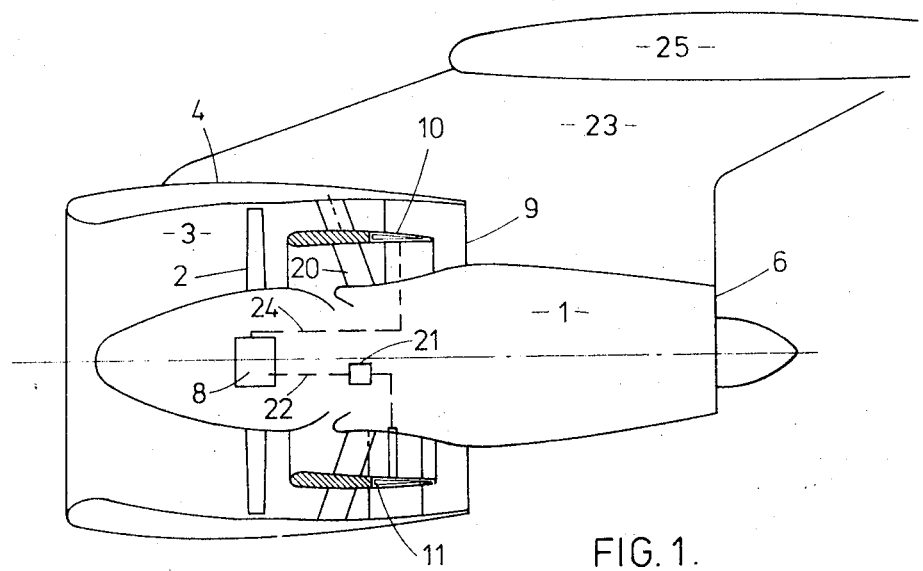
FIG. 1 is a sectional view through a ducted fan gas turbine engine of the present invention.

Referring now to the drawings there is shown in FIG. 1 a ducted fan gas turbine engine comprising a gas generator 1 and a front fan or compressor 2 which is disposed within an annular fan duct 3 defined between an outer cowl 4 and the gas generator 1. The gas generator may be of any known type since the type of gas generator does not form part of the invention. The function of the gas generator is to drive the fan and to produce hot gas thrust through a propulsion nozzle 6.

The fan is driven from the gas generator through a gear box 8, and produces a propulsive jet of air through a propulsion nozzle 9. Oil for lubrication of the gear box 8 is retained in an oil tank 10 which forms the rear part of an accoustically lined flow splitter 11 at approximately the mid-radius height of the duct 3.

The tank is annular and occupies the whole of the space defined by an inner wall 12 of the splitter at the rear end thereof which constitutes the external wall of the tank. The wall 12 is surrounded by an outer wall 14 which is radially spaced from the inner wall on both sides of the tank to define annular flow passages for hot oil, which constitute the oil cooler.

Figure 2:
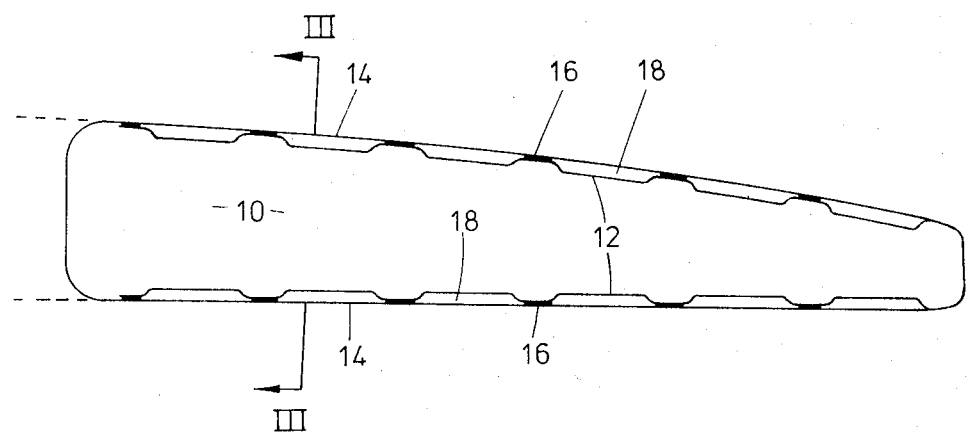
FIG. 2 is an enlarged view of the rearward portion of the splitter in the fan duct of the engine of FIG. 1.

The construction of the tank and cooler can be more clearly seen in FIG. 2. The wall 12 is of corrugated form to give it strength and is seam-welded to the outer wall 14 on both sides of the tank at points 16, on the top portions of the corrugations, thus dividing the oil cooling flow passages into a plurality of annular channels 18 between the welds.

Figure 3:
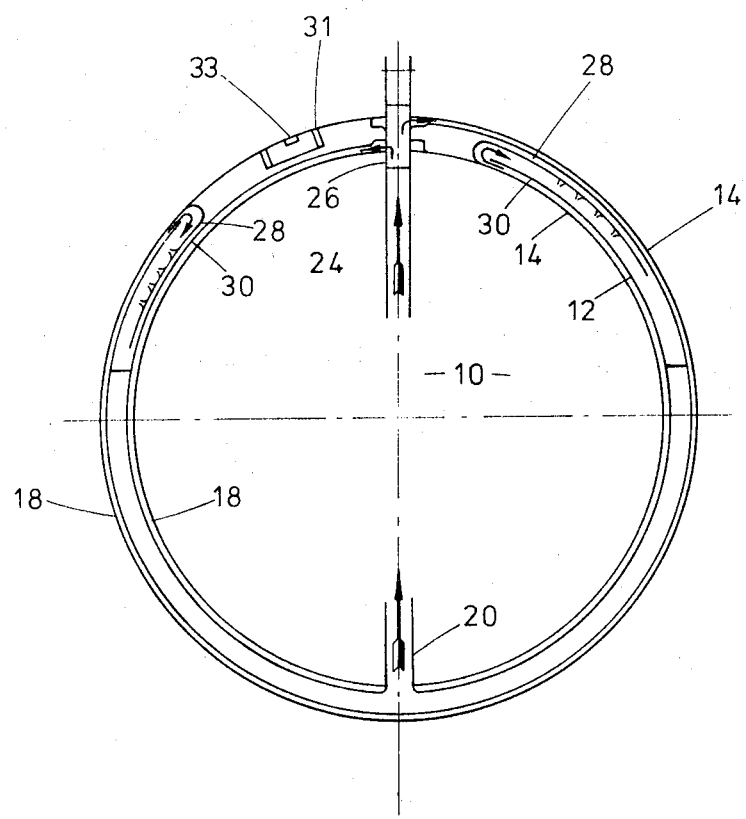
FIG. 3 is a cross-sectional view through the splitter on the line III—III of FIG. 2, but of a reduced scale.

The oil flow path can be seen in FIG. 3. Oil is withdrawn from the tank from a pipe 20 at the bottom of the tank, (Arrow A) by means of a pump 21 (FIG. 1). It is passed to the gear box through a pipe 22 (FIG. 1) and is returned through a pipe 24 (FIG. 1) to the cooler via a valve 26 (Arrow B). The pipes and valves 26 are housed in the cowling of the main support structure 23 which supports the engine from the aircraft wing 25.

As can be seen from FIG. 3 oil is passed from the valve 26 to the radially inner oil cooler passage (Arrow C) and runs completely around the internal annular channels 18 thus contacting a large area of the outer wall of the splitter for cooling purposes. It is then turned inwardly by an oil/air separator plate 28 into the tank (Arrow D). The air is separated from the oil partly centrifugally and partly as it runs down the plate around the plunged holes 30. Any air which separates from the oil passes out through the holes 30 while the oil runs off the plate into the tank. Similarly hot oil is also fed to the radially outer annular passage from the valve (Arrow E) and runs around the annular channels 18 in contact with the radially outer wall of the splitter. A second air/oil separator plate is provided at the opposite end of these channels to turn the oil into the tank (Arrow F). A final filter and separator 31 is supplied around a tank vent 33.

It will be appreciated that in a high by-pass ratio engine where the fan duct is of large diameter, the surface area of the flow splitter which is available for oil cooling is quite large, and since both sides of the splitter are scrubbed by cold fan air a large amount of cooling can be done with this construction of oil cooler. The remaining surface area of the splitter is used for supporting an acoustic liner for silencing purposes.

Figure 4:
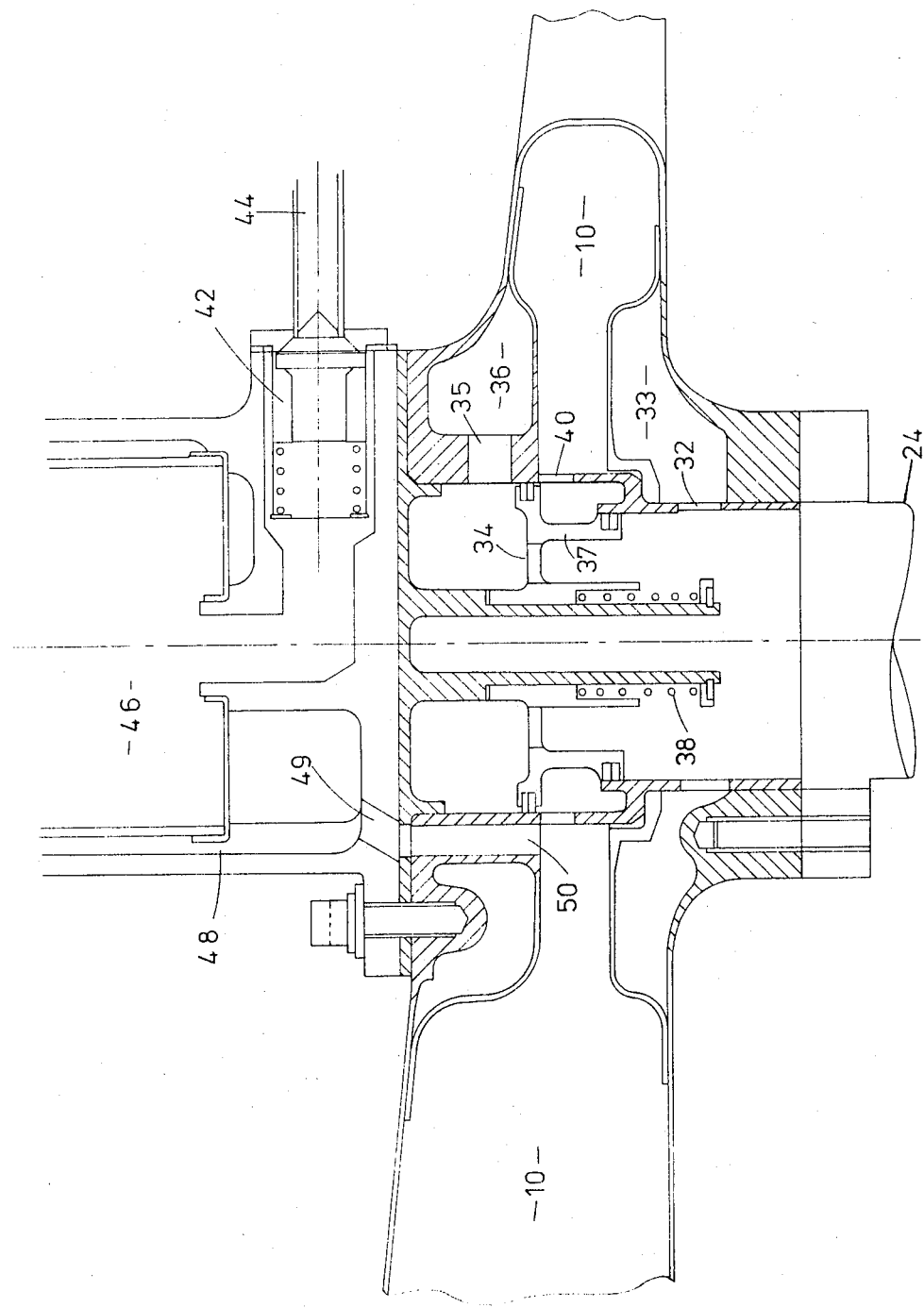
FIG. 4 is a sectional view through the tank at the position of a valve which directs oil into the cooler.

FIG. 4 shows the valve 26 and the arrangement by which the hot oil is fed into the annular channels.

The valve 26 forms an integral part of the tank, on top of the splitter within the structure 23. It serves to by-pass the oil cooler and pass the oil directly into the tank should the oil passage around the cooler become blocked.

Oil from the gear box returning up the pipe 24 can pass through an orifice 32 into a chamber 33 communicating with the radially inner cooler passage, and through orifices 34 and 35 into a chamber 36 communicating with the radially outer cooler passage.

Orifice 34 is formed in a piston 37 which has different areas exposed to the hot oil on its opposite sides. Under normal conditions there is a slight pressure drop across the orifices so that the pressure above the piston is slightly less than that below the piston. Due to the differential areas of the piston and a spring 38, the piston remains in the position shown in FIG. 4. If, however, the cooler becomes blocked, for example, in very cold conditions when the oil in the annular channels 18 congeals, the pressures above and below the piston equalize and the piston moves down due to the greater force on the larger area of the top of the piston. Downward movement of the piston opens a further orifice 40 which directs the hot oil directly into the tank. The hot oil will warm up the tank and melt the congealed oil, thus allowing a flow to take place around the cooler through orifices 32, 34 and 35 and restoring the pressure differential across the piston. The spring then moves the piston back to its normal operating position.

A further feature of the valve 26 is that it incorporates the oil tank filler. A non-return valve 42 in a pressure filling line 44 allows oil into a chamber 46 from which the oil can find its way via passages 48, 49 and 50 into the tank.

The chamber 33 extends around the hot oil inlet pipe 24 and communicates with the ends of all the channels 18 a small distance around the circumference of the splitter.

Apart from providing a large cooling surface area without the normal bulky oil cooler and its attendant pressure losses, the present construction of oil tank and cooler has further advantages. All return pipes from the cooler to the tank are eliminated and the risk of leakage is reduced. Further should the oil tank leak, it can only leak into the cooler.

The tank and cooler are protected from bird strikes by the upstream portion of the accoustically lined splitter. Further, because the downstream end of the splitter is tapered the acoustic lining thickness will vary and will be less efficient at absorbing the noise produced by the fan. Hence the loss of sound absorption, by removing the acoustic lining from the tail end of the splitter is less than if the central part of the splitter were used for an oil tank.

The heat taken from the cooler heats the fan air and this can marginally increase the thrust from the nozzle 9.

Separation of air and oil takes place in the cooler and air/oil separators are not required.

Various alternative constructions are clearly possible without departing from the scope of the invention. For example, it may only be necessary to have cooling surface on one side of the splitter, so that more acoustic lining can be applied to the other.

The embodiment described provides annular channels for the oil flow, but these may not be necessary if the inner and outer walls 12 and 14 can be made strong enough to withstand the internal pressures without corrugation.

If necessary the outer wall of the cooler may be the one which is of corrugated or castellated form to provide a greater area exposed to the cooling flow, although this may introduce a performance penalty in the fan air in the duct.

The gear box oil and the normal engine oil supplies may both be passed through the cooler, and in this case the two oil systems may be separated, one being passed to the radially outer cooler passage and the other through the radially inner cooler passage, so that both systems will not necessarily be lost should damage occur to one part of the cooler.

Although in the above described system the oil tank and cooler were provided in a splitter on the by-pass duct of a fan engine, clearly the concept of a combined cooler and tank can also be applied to any surface of the by-pass passage of a by-pass gas turbine engine, or even to an aircraft wing.

The engine may be an aft fan or fron fan engine, and in either case the flow splitter containing the oil tank may be positioned upstream or downstream of the fan.

We claim:

1. A gas turbine engine comprising a gas generator driving a compressor, a duct in which said compressor is disposed and along which air passing through the compressor flows, and an oil tank and cooler assembly, said assembly including an oil tank having an external wall, an outer wall which is spaced apart from said external wall to provide an oil cooling passage for the flow therethrough of oil in contact with said outer wall, and means defining passageways communicating between the oil cooling passage and the tank for returning cooled oil to the tank, said outer wall having an outer surface which is exposed to air flowing along the duct, ducting being provided for supplying oil from the tank to a location of use in the engine and for returning said oil from the location of use to the oil cooling passage.

2. A gas turbine engine as claimed in claim 1 and wherein the engine is a ducted fan gas turbine engine, and the compressor is the fan of said engine.

3. A gas turbine engine as claimed in claim 2 and wherein a gear box is provided between the gas generator and the fan, means being provided for drivingly interconnecting the gas generator, the gear box and the fan.

4. A gas turbine engine as claimed in claim 1 and wherein said means defining passageways communicating between the oil cooling passage and the tank includes means for separating air from the oil in said oil cooling passage.

5. A gas turbine engine according to claim 1 and wherein the engine is a ducted fan gas turbine engine including a fan disposed in a duct, and an annular flow splitter disposed in the duct and dividing the duct into radially inner and outer flow paths, an annular oil tank being formed in the interior of the splitter and being surrounded on both the radially inner and radially outer sides by outer walls which define with the external walls of the oil tank annular oil cooling passages having outer surfaces exposed respectively to air flowing along the radially inner and outer flow paths.

6. A gas turbine engine as claimed in claim 1 and wherein the external wall of the oil tank is of corrugated form and the outer wall is connected to said external wall at the top portions of the corrugations.

7. A gas turbine engine as claimed in claim 1 and wherein a by-pass system is provided whereby the hot oil returning from the location of use is fed directly into the tank.

8. A gas turbine engine as claimed in claim 2 and wherein the duct contains a flow splitter, the oil tank is formed in the interior of the splitter and said outer wall of the oil tank and cooler assembly is exposed to the relatively cool air flowing down the duct.

9. A gas turbine engine as claimed in claim 5 and wherein the oil tank and cooler assembly is disposed at the downstream end of the flow splitter.

* * * * *